(12) United States Patent
Tsai et al.

(10) Patent No.: US 10,859,442 B2
(45) Date of Patent: *Dec. 8, 2020

(54) THERMAL PILE SENSING STRUCTURE INTEGRATED WITH CAPACITOR

(71) Applicant: PixArt Imaging Incorporation, HsinChu (TW)

(72) Inventors: Ming-Han Tsai, HsinChu (TW); Shin-Lin Wang, HsinChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,517

(22) Filed: Jul. 4, 2019

(65) Prior Publication Data

US 2019/0323896 A1 Oct. 24, 2019

Related U.S. Application Data

(63) Continuation of application No. 16/194,385, filed on Nov. 18, 2018, now Pat. No. 10,386,240, which is a continuation of application No. 15/917,606, filed on Mar. 10, 2018, now Pat. No. 10,161,802, which is a continuation of application No. 15/249,214, filed on Aug. 26, 2016, now Pat. No. 9,945,726.

(30) Foreign Application Priority Data

Nov. 12, 2015 (TW) .............................. 104137358 A

(51) Int. Cl.
*G01J 5/16* (2006.01)
*G01J 5/02* (2006.01)
*G01J 5/12* (2006.01)

(52) U.S. Cl.
CPC ................ *G01J 5/16* (2013.01); *G01J 5/024* (2013.01); *G01J 5/12* (2013.01)

(58) Field of Classification Search
CPC ................ G01J 5/16; G01J 5/024; G01J 5/12
See application file for complete search history.

(56) References Cited

U.S. PATENT DOCUMENTS

| 8,552,380 B1 * | 10/2013 | Florin ........................ G01J 5/12 250/338.4 |
| 2016/0282194 A1 * | 9/2016 | Barnett ...................... G01J 5/04 |
| 2019/0027522 A1 * | 1/2019 | Kropelnicki ............ G01J 5/048 |

* cited by examiner

*Primary Examiner* — Christine S. Kim
(74) *Attorney, Agent, or Firm* — Tung & Associates

(57) ABSTRACT

The present invention discloses a thermal pile sensing structure integrated with one or more capacitors, which includes: a substrate, an infrared sensing unit and a partition structure. The infrared sensing unit includes a first and a second sensing structure. A hot junction is formed between the first and the second sensing structures at a location where the first and the second sensing structures are close to each other. A cold junction is formed between the partition structure and the first sensing structure at a location where these two structures are close to each other. Another cold junction is formed between the partition structure and the second sensing structure at a location where these two structures are close to each other. A temperature difference between the hot junction and the cold junction generates a voltage difference signal. Apart of the partition structure forms at least one capacitor.

7 Claims, 6 Drawing Sheets

THERMAL PILE SENSING STRUCTURE INTEGRATED WITH CAPACITOR

CROSS REFERENCE

The present invention is a continuation application of Ser. No. 16/194,385, filed Nov. 18, 2018 which is a continuation application of Ser. No. 15/917,606, filed Mar. 10, 2018 which is a continuation application of Ser. No. 15/249,214, filed Aug. 26, 2016 which claims priority to TW 104137358, filed on Nov. 12, 2015.

BACKGROUND OF THE INVENTION

Field of Invention

The present invention relates to a thermal pile sensing structure integrated with one or more capacitors; particularly, it relates to such a thermal pile sensing structure which is integrated with a MIM capacitor or a PIP capacitor, to reduce the chip area and noise.

Description of Related Art

Please refer to FIG. 1 in conjugation with FIG. 2. FIG. 1 shows a block diagram of a conventional thermal pile sensing structure which is applied in a temperature sensing module. FIG. 2 shows a cross section view of the conventional thermal pile sensing structure. The conventional temperature sensing module 100 comprises the conventional thermal pile sensing structure 10, a noise filter 81, a noise filter 82, a differential amplifier Amp, an analog-to-digital convertor ADC and a temperature sensor 80. The thermal pile sensing structure 10 is capable of generating a voltage difference signal VDS according to a temperature difference, whereby the temperature sensing module 100 can sense temperature. The voltage difference signal VDS (which is a differential signal) generated by the thermal pile sensing structure 10 is processed by the noise filter 81 and the noise filter 82, and inputted to the differential amplifier Amp. The output (which is also a differential signal) of the differential amplifier Amp is inputted to the analog-to-digital convertor ADC. The analog-to-digital convertor ADC also receives a temperature signal TS outputted from the temperature sensor 80. The noise filter 81 and the noise filter 82 includes a capacitor C1 and a capacitor C2, respectively. Besides, the conventional temperature sensing module 100 further comprises a capacitor C3. In this prior art, the capacitor C1, the capacitor C2 and the thermal pile sensing structure 10 are three independent components, which are packaged separately.

Please refer to FIG. 2. The conventional thermal pile sensing structure 10 comprises: a substrate 11; an infrared sensing unit 16; and a partition structure 15. The infrared sensing unit 16 is formed on the substrate 11. The infrared sensing unit includes a first sensing structure 161 and a second sensing structure 162, wherein a hot junction H is formed between the first sensing structure 161 and the second sensing structure 162 at a location where the first sensing structure 161 and the second sensing structure 162 are close to each other. The partition structure 15 surrounds the infrared sensing unit 16. A cold junction C is formed between the partition structure 15 and the first sensing structure 161 at a location where the partition structure 15 and the first sensing structure 161 are close to each other and another cold junction C is formed between the partition structure 15 and the second sensing structure 162 at a location where the partition structure 15 and the second sensing structure 162 are close to each other. The temperature difference between the hot junction H and the cold junction C generates the voltage difference signal VDS. In order for the infrared sensing unit 16 to sense the signal more accurately, this prior art further includes a light filter layer 14, which is connected to the thermal pile sensing structure 10 via a bonding layer 13.

If the thermal pile sensing structure 10 is manufactured by a CMOS manufacturing process, the partition structure 15 usually includes a polysilicon layer Poly 1, plural metal layers M1-M4 (shown to be four layers in FIG. 2, but the number of the layers is not necessarily four) and plural via layers V. The first sensing structure 161 and the second sensing structure 162 are made of the metal layer M1 and the polysilicon layer Poly 1. Dielectric layers 12 provide insulation between the electrically conductive structures. The voltage difference signal VDS is transmitted through a transistor circuit 17.

In this prior art, as mentioned-above, the capacitor C1 and the capacitor C2 are provided between the thermal pile sensing structure 10 and the electrical circuit, to filter noises. The capacitor C1, the capacitor C2 and the thermal pile sensing structure 10 are three independent components, which are packaged separately. Hence, this prior art is disadvantageous in that: the overall size of the module is larger, and the manufacturing cost is high.

In view of the above, to overcome the drawbacks in the prior art, the present invention proposes a thermal pile sensing structure integrated with a MIM capacitor a PIP capacitor, which reduces the chip area and also reduces the noise.

SUMMARY OF THE INVENTION

From one perspective, the present invention provides a thermal pile sensing structure, comprising: a substrate; an infrared sensing unit located on or above the substrate, the infrared sensing unit including a first sensing structure and a second sensing structure, wherein a hot junction is formed between the first sensing structure and the second sensing structure at a location where the first sensing structure and the second sensing structure are close to each other; and a partition structure, which surrounds the infrared sensing unit, wherein a cold junction is formed between the partition structure and the first sensing structure at a location where the partition structure and the first sensing structure are close to each other and another cold junction is formed between the partition structure and the second sensing structure at a location where the partition structure and the second sensing structure are close to each other; wherein the temperature difference between the hot junction and the cold junction generates a voltage difference signal and a part of the partition structure forms at least one capacitor.

In one embodiment, the at least one capacitor includes a Metal-Insulator-Metal (MIM) capacitor or a Polysilicon-Insulator-Polysilicon (PIP) capacitor.

In one embodiment, the partition structure includes a stack of metal layers and via layers, and the MIM capacitor includes an upper electrode and a lower electrode which are formed by the metal layers.

In one embodiment, the partition structure includes a stack of metal layers, via layers and polysilicon layers, and the PIP capacitor includes an upper electrode and a lower electrode which are formed by the polysilicon layers.

In one embodiment, the thermal pile sensing structure further comprises: a dielectric layer located on or above the substrate, wherein the infrared sensing unit and the partition structure are formed within the dielectric layer.

In one embodiment, the thermal pile sensing structure further comprises: a bonding layer located on or above the dielectric layer; and a light filter layer for filtering out signals other than infrared light signals, wherein the light filter layer is connected to the dielectric layer via the bonding layer.

In one embodiment, the temperature difference between the hot junction and the cold junction is processed by a transistor circuit to generate the voltage difference signal, wherein the transistor circuit is formed on the substrate.

From another perspective, the present invention provides a thermal pile sensing structure integrated with one or more capacitors, comprising: a substrate having a chamber; an infrared sensing unit located on or above the substrate, the infrared sensing unit including a first semiconductor stack structure, wherein a hot junction is formed at one end of the first semiconductor stack structure which is in the chamber; and a partition structure, which is located at peripheral of the infrared sensing unit, wherein a cold junction is formed between the partition structure and the first semiconductor stack structure at a location where the partition structure and the first semiconductor stack structure are close to each other; wherein a temperature difference between the hot junction and the cold junction generates a voltage difference signal and a part of the partition structure forms at least one capacitor.

In one embodiment, each of the partition structure and the first semiconductor stack structure includes plural layers, and at least one of the layers of the partition structure and one of the layers of the first semiconductor stack structure are at a same elevation level and made of a same material.

In one embodiment, the at least one capacitor includes a Metal-Insulator-Metal (MIM) capacitor or a Polysilicon-Insulator-Polysilicon (PIP) capacitor.

In one embodiment, the first semiconductor stack structure includes two layers which are made of different thermal conductive materials and connected to each other, wherein the thermal conductive materials have different Seebeck coefficients.

In one embodiment, the thermal pile sensing structure further comprises: a second semiconductor stack structure, wherein the hot junction is formed between the first semiconductor stack structure and the second semiconductor stack structure at a location where the first semiconductor stack structure and the second semiconductor stack structure are close to each other, and the cold junction is formed between the partition structure and the first semiconductor stack structure at a location where the partition structure and the first semiconductor stack structure are close to each other, wherein another cold junction is formed between the partition structure and the second semiconductor stack structure at a location where the partition structure and the second semiconductor stack structure are close to each other.

In one embodiment, each of the partition structure and the second semiconductor stack structure includes plural layers, and at least one of the layers of the partition structure and one of the layers of the second semiconductor stack structure are at a same elevation level and made of a same material.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be better understood with regard to the detailed description of the embodiments below, with reference to the drawings. The drawings as referred to throughout the description of the present invention are for illustration only, to show the interrelations between the apparatus and devices, but not drawn according to actual scale.

Figure 1:
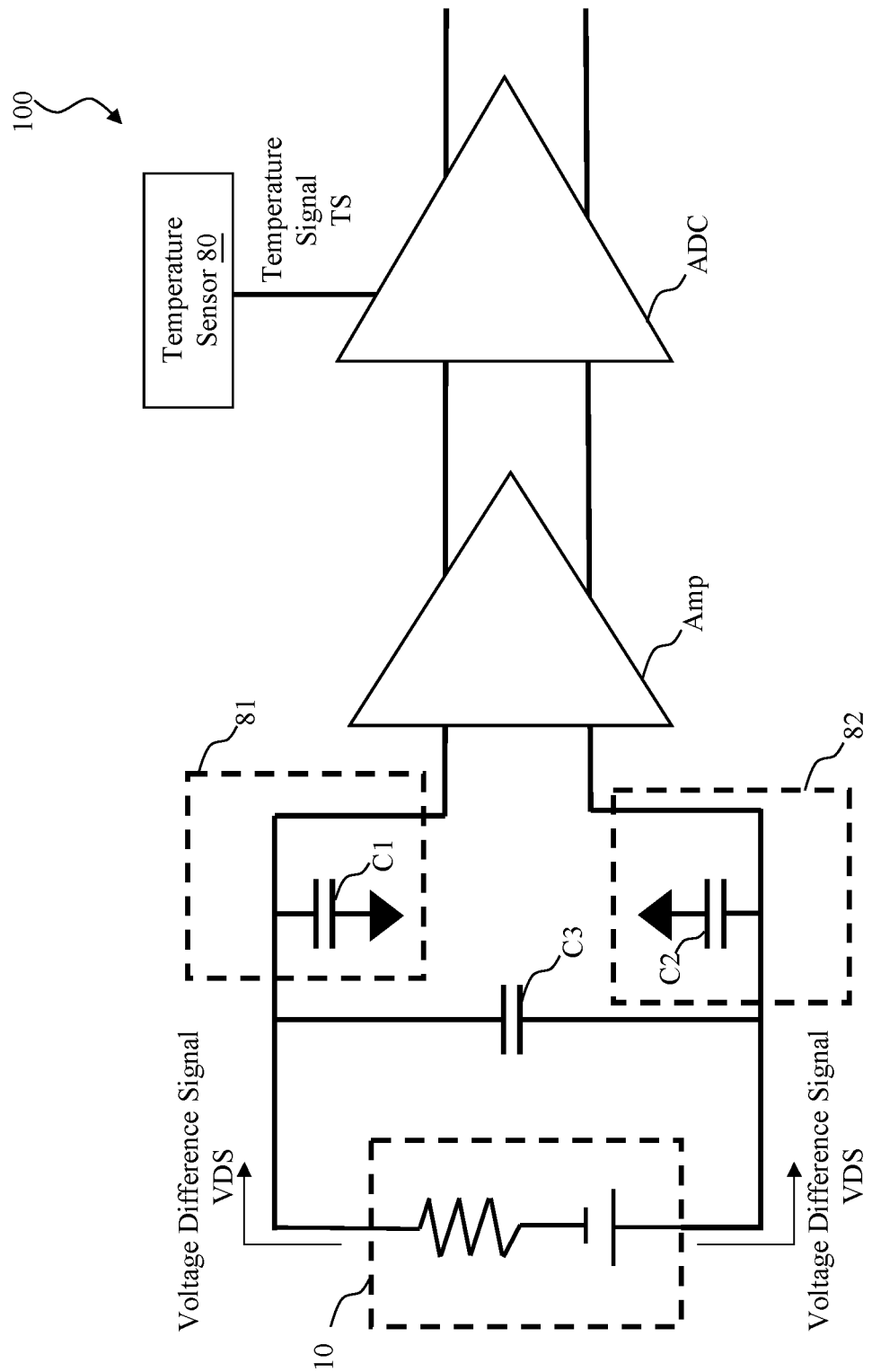
FIG. 1 shows a block diagram of a conventional thermal pile sensing structure which is applied in a temperature sensing module.
Figure 2:
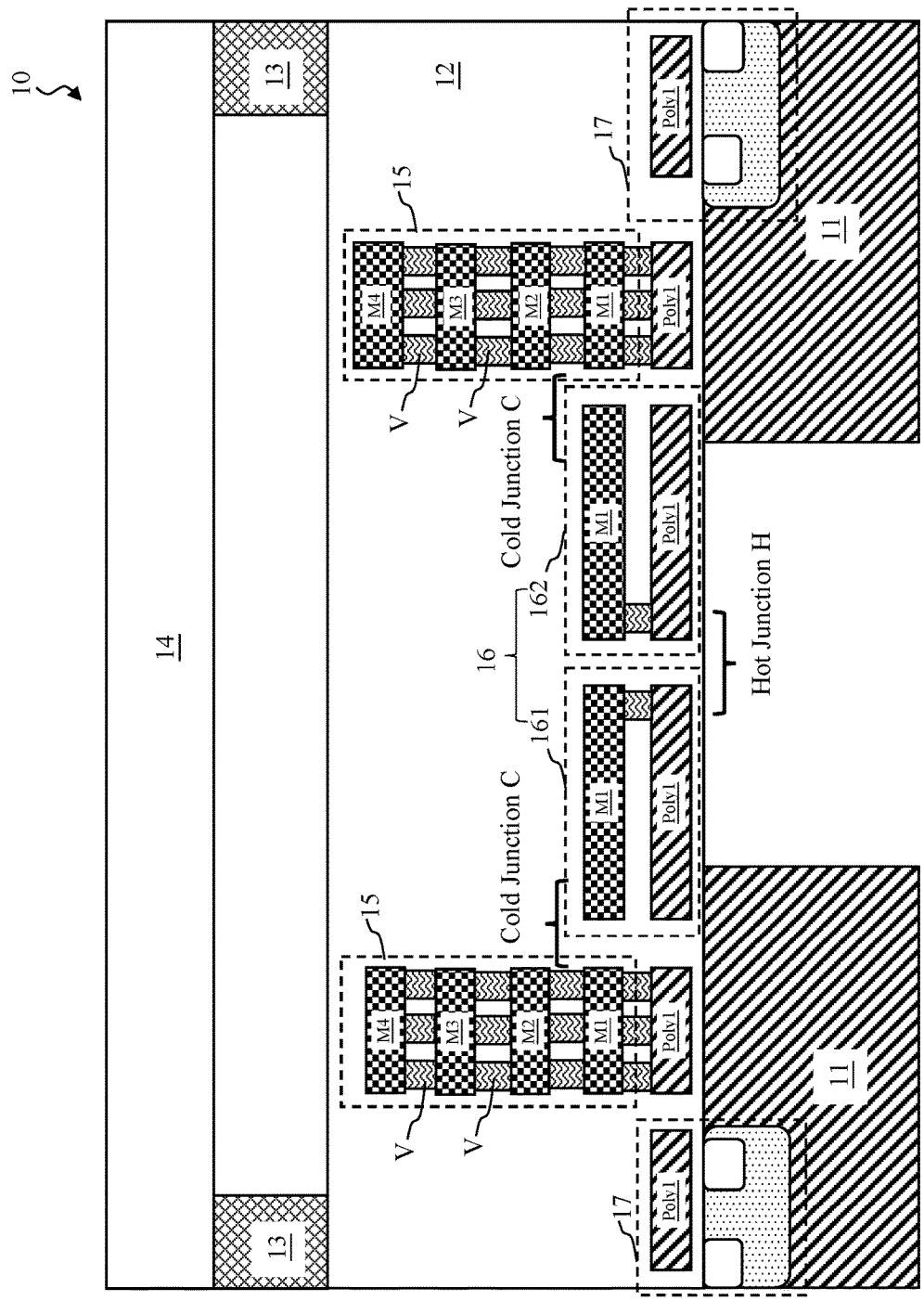
FIG. 2 shows a cross section view of a conventional thermal pile sensing structure.
Figure 3:
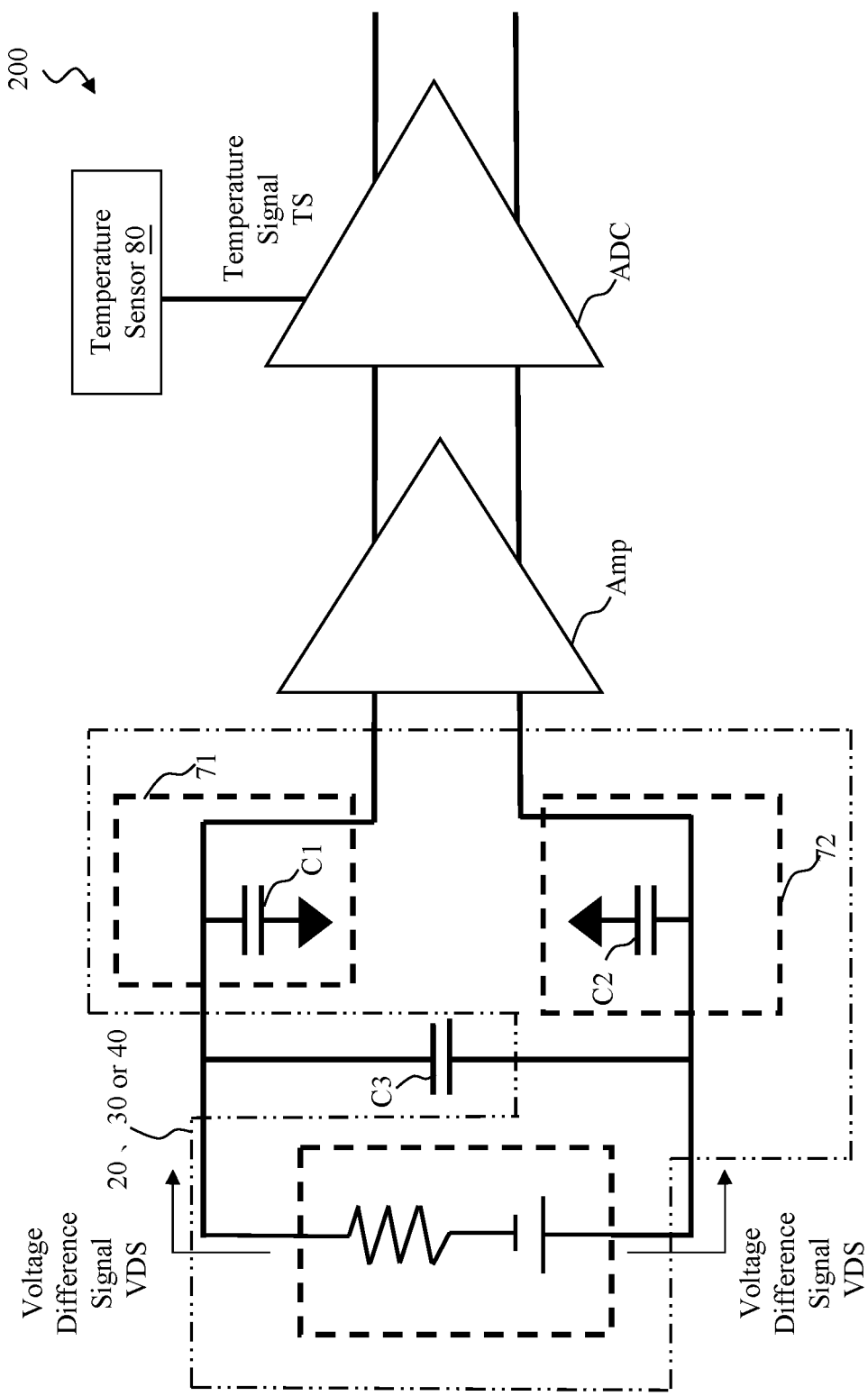
FIG. 3 shows a block diagram of a thermal pile sensing structure of the present invention which is applied in a temperature sensing module.
Figure 4:
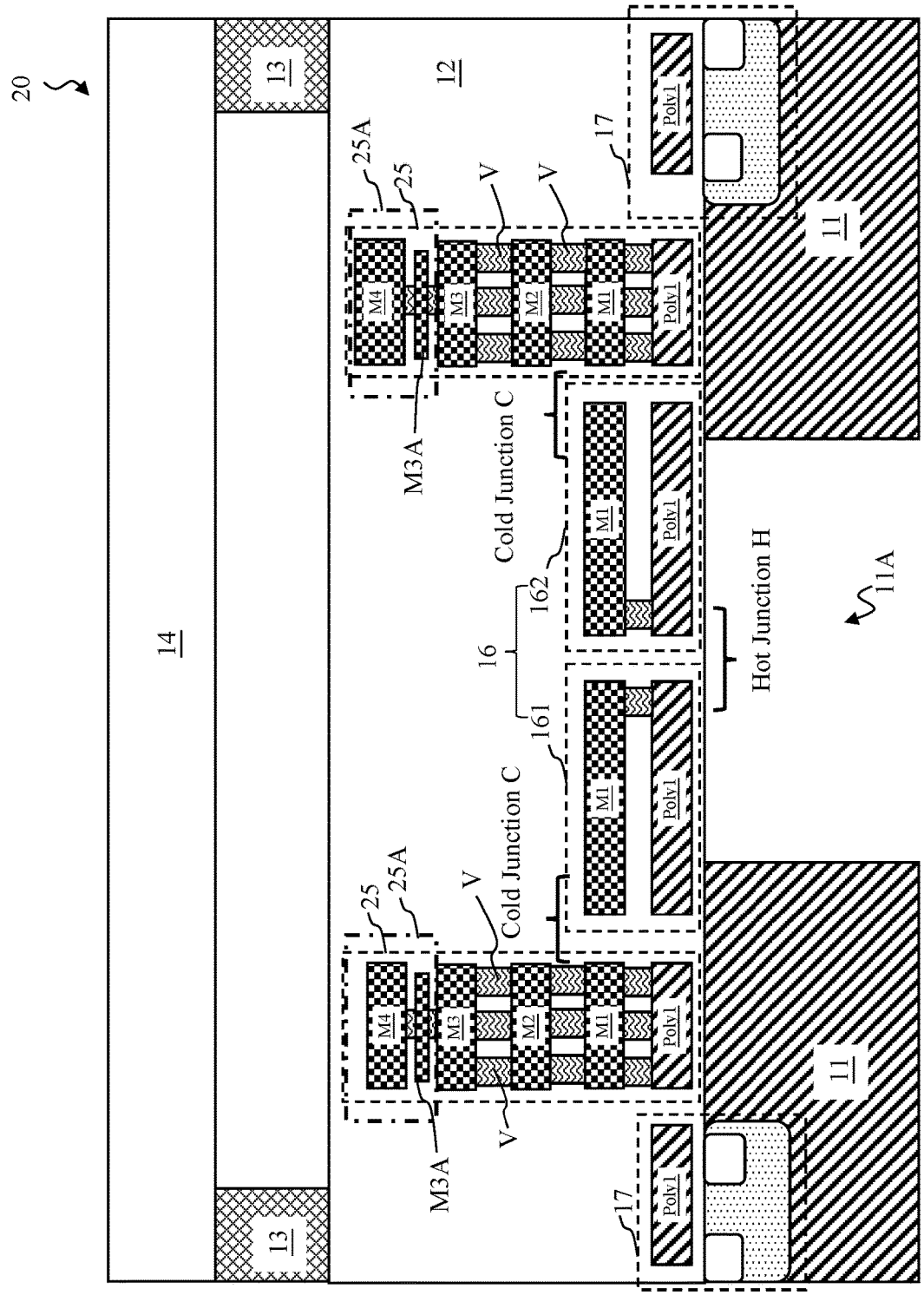
FIG. 4 shows a cross section view of the thermal pile sensing structure integrated with a capacitor according to a first embodiment of the present invention.

Please refer to FIG. 3 in conjugation with FIG. 4. FIG. 3 shows a block diagram of a thermal pile sensing structure of the present invention, which is applied in a temperature sensing module. FIG. 4 shows a cross section view of the thermal pile sensing structure according to a first embodiment of the present invention, wherein the thermal pile sensing structure is integrated with at least one capacitor. The temperature sensing module 200 of this embodiment comprises the thermal pile sensing structure 20, which is integrated with capacitors C1 and C2, a differential amplifier Amp, an analog-to-digital convertor ADC, and a temperature sensor 80. The temperature sensing module 200 of this embodiment is different from the conventional temperature sensing module 100 in that: in the conventional temperature sensing module 100, the conventional thermal pile sensing structure 10, the noise filter 81 and the noise filter 82 (i.e., the capacitor C1 and the capacitor C2) are three independent components, which are packaged separately. However, in the thermal pile sensing structure 20 of this embodiment, the noise filter 71 (including the capacitor C1) and the noise filter 72 (including the capacitor C2) are integrated into the thermal pile sensing structure 20. In other words, the thermal pile sensing structure 20, the capacitor C1 and the capacitor C2 are packaged into one single integrated device (the details as to how the capacitor C1 and the capacitor C2 are integrated into the thermal pile sensing structure 20 will be described later).

The operation of the thermal pile sensing structure 20 is based upon the Seebeck effect. The so-called Seebeck effect is thus: the Seebeck coefficient of an electrically conductive material is a measure of the magnitude of an induced thermoelectric voltage in response to a temperature difference across that electrically conducting material. Therefore, if different temperatures are applied to two ends (e.g., the hot junction H and the cold junction C shown in FIG. 4) of an electrically conductive material, a voltage difference signal will be induced. This voltage difference signal can be amplified if different types of electrically conductive materials are used to sense the temperature difference. In brief, the thermal pile sensing structure 20 of this embodiment senses the temperature by generating a voltage difference signal VDS (as shown in FIG. 3) in response to a temperature difference between the hot junction H and the cold junction C (as shown in FIG. 4).

The voltage difference signal VDS (which is a differential signal) generated by the thermal pile sensing structure 20 is processed by the internally integrated noise filter 71 and the noise filter 72. The processed voltage difference signal VDS is inputted to the differential amplifier Amp. The signal (which is a differential signal) outputted from the differential amplifier Amp is inputted to the analog-to-digital convertor ADC. Optionally but preferably, a capacitor C3 can be disposed between the two input ends of the analog-to-digital convertor ADC to stabilize the signal. In addition, the analog-to-digital convertor ADC can also receive, for example but not limited to, a temperature signal TS outputted by the temperature sensor 80. The operation of the temperature sensing module 200 is well known to those skilled in the art, so the specific details thereof are not redundantly repeated here.

Please refer to FIG. 4. The thermal pile sensing structure 20 of this embodiment comprises: a substrate 11, an infrared sensing unit 16, a partition structure 25, a bonding layer 13 and a light filter layer 14. The substrate 11 can be, for example but not limited to, a silicon substrate. The substrate 11 has a chamber 11A. The infrared sensing unit 16 is formed on or above the substrate 11, for sensing infrared light signals. In one embodiment, the infrared sensing unit 16 is configured to sense far infrared light signals.

In one embodiment, from a cross-section view (e.g., FIG. 4), the infrared sensing unit 16 includes at least a first sensing structure 161 and a second sensing structure 162. As shown in FIG. 4, the first sensing structure 161 can be, for example but not limited to, a first semiconductor stack structure. In one embodiment, the first semiconductor stack structure includes at least two thermal conductive materials whose Seebeck coefficients are different from each other. In one embodiment, the first sensing structure 161 includes, from top to bottom, for example but not limited to, a metal layer M1 and a polysilicon layer Poly1. As shown in FIG. 4, the second sensing structure 162 can be, for example but not limited to, a second semiconductor stack structure. In one embodiment, the second semiconductor stack structure includes at least two thermal conductive materials whose Seebeck coefficients are different from each other. In one embodiment, the second sensing structure 162 includes, from top to bottom, for example but not limited to, a metal layer M1 and a polysilicon layer Poly1. The metal layer M1 and the polysilicon layer Poly1 are both thermal conductive materials, but the Seebeck coefficient of the metal layer M1 is different from the Seebeck coefficient of the polysilicon layer Poly1. In this embodiment, the first sensing structure 161 and the second sensing structure 162 are arranged symmetrically, wherein a hot junction H is formed between the first sensing structure 161 and the second sensing structure 162 at a location where the first sensing structure 161 and the second sensing structure 162 are close to each other (i.e., at an end of the first sensing structure 161 that is closer to the chamber 11A, and at an end of the second sensing structure 162 that is closer to the chamber 11A). The partition structure 25 is located at the periphery of the infrared sensing unit 16 and surrounds the infrared sensing unit 16. A cold junction C is formed between the partition structure 25 and the first sensing structure 161 at a location where the partition structure 25 and the first sensing structure 161 are close to each other, and another cold junction C is formed between the partition structure 25 and the second sensing structure 162 at a location where the partition structure 25 and the second sensing structure 162 are close to each other. As mentioned above, the thermal pile sensing structure 20 of this embodiment senses the temperature by generating a voltage difference signal VDS in response to a temperature difference between the hot junction H and the cold junction C.

Note that the infrared sensing unit 16 does not necessarily include two sensing structures arranged symmetrically (i.e., the first sensing structure 161 and the second sensing structure 162). In another embodiment, the infrared sensing unit 16 may include only one sensing structure (for example but not limited to the above-mentioned first semiconductor stack structure; that is, the first sensing structure 161). In this case, a hot junction H is formed at a location that is close to the chamber 11A. A cold junction C is formed between the partition structure 25 and the first sensing structure 161 at a location where the partition structure 25 and the first sensing structure 161 are close to each other. Similarly, as mentioned above, the thermal pile sensing structure 20 of this arrangement can still sense the temperature by generating a voltage difference signal VDS in response to a temperature difference between the hot junction H and the cold junction C. More specifically, in one embodiment, from a cross-section view, the infrared sensing unit 16 may include only one sensing structure, and the infrared sensing unit 16 is not symmetrical. Or, in another embodiment, from a top view, the sensing structure is a semiconductor stack structure having a sector or a circle shape, with the hot junction H being a center and the cold junction C being a circumference of the sector or circle. In this case, from the cross-section view (e.g., FIG. 4), the infrared sensing unit 16 includes two sensing structures which are arranged symmetrically, but these two sensing structures, however, are actually two different parts of one same semiconductor stack structure. All of the above-mentioned embodiments are within the scope of the present invention. Moreover, the embodiment of FIG. 4 includes a dielectric layer 12 which is located on or above the substrate 11. In one embodiment, the dielectric layer 12 can be made of, for example but not limited to, silicon oxide (SiO2). The dielectric layer 12 of this embodiment for example can be used to absorb infrared rays. The infrared sensing unit 16 and the partition structure 25 of this embodiment are formed within the dielectric layer 12.

The bonding layer 13 is formed on or above the dielectric layer 12. The light filter 14 is connected to the dielectric layer 12 via the bonding layer 13. The light filter 14 filters signals other than infrared light signals for the thermal pile sensing structure 20.

The light filter 14 allows an infrared light signal emitted or reflected from a certain object (not shown) to pass through. In one embodiment, the thickness of the light filter 14 can be, for example but not limited to, within a range from 5 μm to 15 μm. In one embodiment, the light filter 14 can be made of a material of, for example but not limited to, polyethylene (PE), polypropylene/polypropene (PP) or polyethylene terephthalate (PET). The light filter 14 can, in addition to filtering out unwanted light signals, prevent dirt from entering into the thermal pile sensing structure 20.

The temperature difference generated by the infrared sensing unit 16 can be processed by a circuit, to generate the voltage difference signal VDS. Such a circuit can be, for example but not limited to, a transistor circuit 17 (as shown in FIG. 4) formed on or above the substrate 11.

In one embodiment, the thermal pile sensing structure 20 of this embodiment can be made by means of a standard CMOS manufacturing process. By depositing polysilicon, metals and silicon oxide, and etching them to desired patterns, can form the transistor circuit 17, the infrared sensing unit 16, the partition structure 25 and the dielectric layer 12. In subsequent steps, the substrate 11 can be further etched by, for example but not limited to, a backside silicon etching step, so as to form the substrate 11 having a chamber 11A as shown in FIG. 4. Next, in subsequent steps, the bonding layer 13 and the light filter 14 can be formed by bonding.

An important feature of the present invention is that: a part of the partition structure 25 forms at least one capacitor. More specifically, referring to FIG. 4: the partition structure 25 includes a stack of four metal layers M1-M4 (e.g., aluminum), plural via layers V (e.g., tungsten), and optionally one or more polysilicon layers (in this embodiment, the polysilicon layer is denoted as Poly1). The number, material, order and layout pattern of the stack may be modified to meet particular conditions and are not limited to the shown embodiment. The number of the metal layers and the via layers can be different, and the metal layers and the via layers can be made of materials different from the above-mentioned materials, and the order and the layout pattern of the stack can be varied (e.g., a via layer V can be at the top of the whole stack). As shown in FIG. 4, in one embodiment, the metal layer M1 of the partition structure 25 and the metal layer M1 of the first sensing structure 161 (i.e., the above-mentioned first semiconductor stack structure) are the same layer (i.e., made by the same step in a CMOS manufacturing process, formed at the same elevation level and made of the same material). And, the polysilicon layer Poly1 of the partition structure 25 and the polysilicon layer Poly1 of the first sensing structure 161 are the same layer (i.e., made by the same step in a CMOS manufacturing process, formed at the same elevation level and made of the same material). In on embodiment, the metal layer M1 of the partition structure 25 and the metal layer M1 of the second sensing structure 162 (i.e., the above-mentioned second semiconductor stack structure) are the same layer (i.e., made by the same step in a CMOS manufacturing process, formed at the same elevation level and made of the same material). And, the polysilicon layer Poly1 of the partition structure 25 and the polysilicon layer Poly1 of the second sensing structure 162 are the same layer (i.e., made by the same step in a CMOS manufacturing process, formed at the same elevation level and made of the same material).

The above-mentioned metal layers M1-M4 and the via layer V are described based upon the general terminology commonly used in a standard CMOS manufacturing process; that is, the metal layers M1-M4 and the via layer V correspond to the metal layers and the via layer in the interconnection structure of a semiconductor microelectronic circuit. However, please note that this embodiment further includes a metal layer M3A between the metal layer M3 and the metal layer M4. The metal layer M4, the insulating layer (i.e., a part of the dielectric layer 12) and the metal layer M3A form a Metal-Insulator-Metal (MIM) capacitor 25A. The metal layer M4 acts as an upper electrode of the MIM capacitor 25A and the metal layer M3 acts as a lower electrode of the MIM capacitor 25A. This MIM capacitor 25A can be used as the above-mentioned capacitor C1 or C2. Thus, the present invention can integrate the capacitor C1 and/or the capacitor C2 into the thermal pile sensing structure 20, to greatly reduce the overall area of the temperature sensing module and the manufacturing cost.

Figure 5:
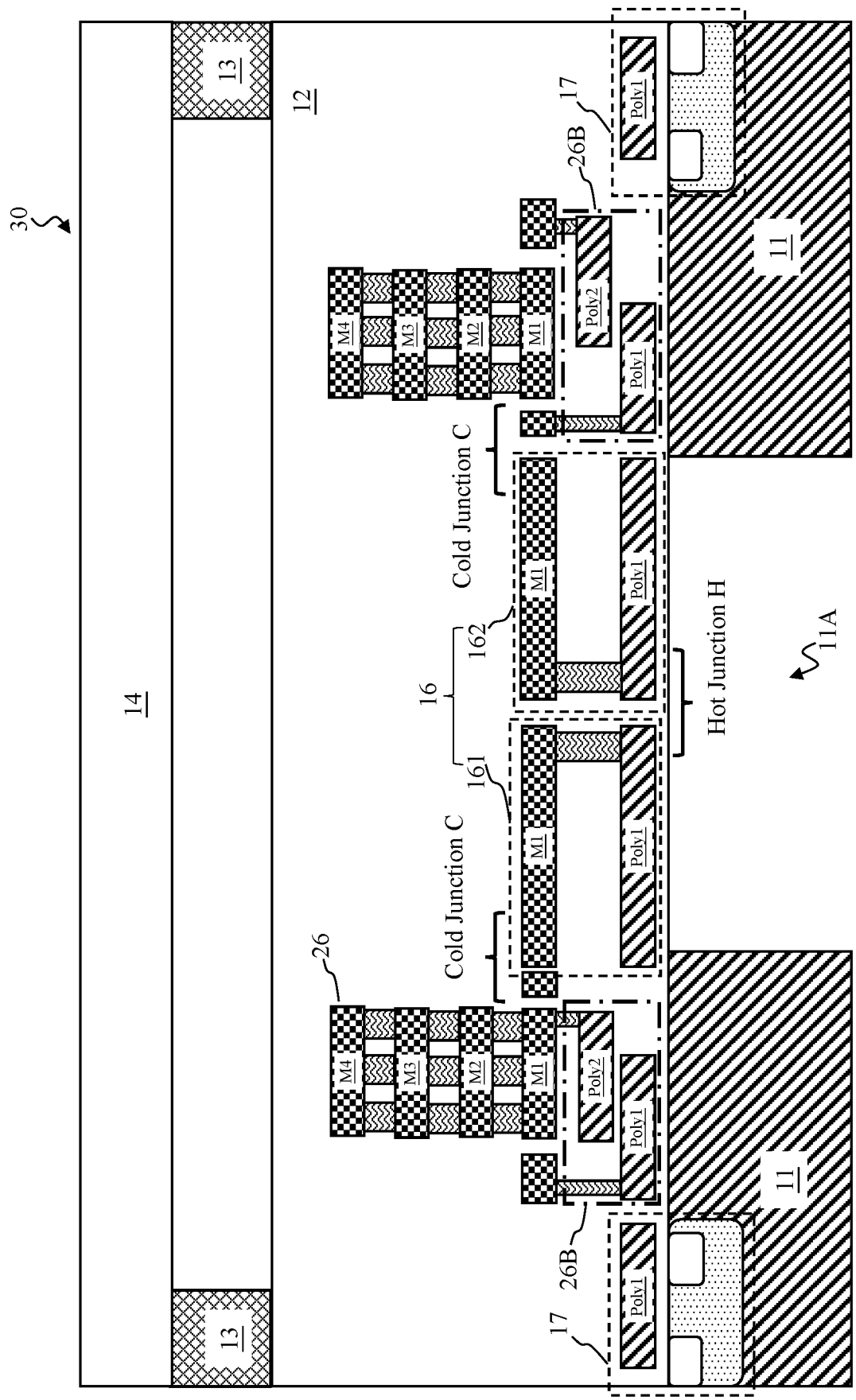
FIG. 5 shows a cross section view of the thermal pile sensing structure integrated with a capacitor according to a second embodiment of the present invention.

Please refer to FIG. 5, which shows a cross section view of the thermal pile sensing structure according to a second embodiment of the present invention. The thermal pile sensing structure 30 of this embodiment is similar to the thermal pile sensing structure 20 of the first embodiment, but is different in that: in the thermal pile sensing structure 30 of this embodiment, as shown in FIG. 5, the partition structure 25 includes, in addition to a stack of four metal layers M1-M4 (e.g., aluminum) and via layers V (e.g., tungsten), two polysilicon layers Poly1 and Poly2. The above-mentioned metal layers M1-M4, via layer V and polysilicon layers Poly1 and Poly2 can be made by a standard CMOS manufacturing process. Similar to the above-mentioned embodiment, the number, material, order and layout pattern of the stack may be modified to meet particular conditions and are not limited to the shown embodiment. In the embodiment shown in FIG. 5, the polysilicon layers Poly1 and Poly2 form a Polysilicon-Insulator-Polysilicon (PIP) capacitor 26B. This PIP capacitor 26B can be used as the above-mentioned capacitor C1 or C2. Thus, the present invention can integrate the capacitor C1 and/or the capacitor C2 into the thermal pile sensing structure 30, to greatly reduce the overall area of the temperature sensing module and the manufacturing cost.

Figure 6:
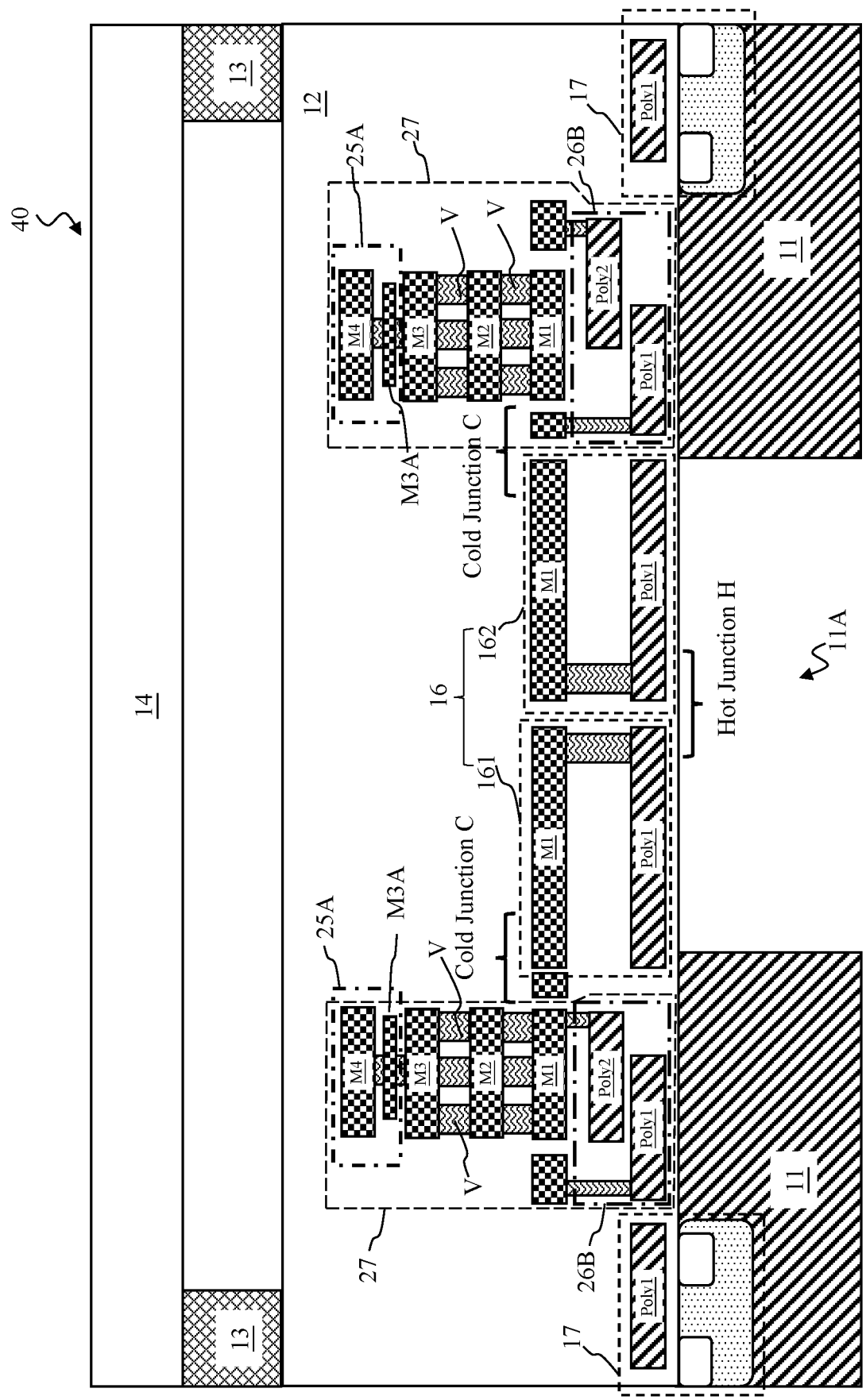
FIG. 6 shows a cross section view of the thermal pile sensing structure integrated with a capacitor according to a third embodiment of the present invention.

Please refer to FIG. 6, which shows a cross section view of the thermal pile sensing structure according to a third embodiment of the present invention. The thermal pile sensing structure 40 of this embodiment is similar to the thermal pile sensing structures 20 and 30 of the above-mentioned embodiments, but is different in that: in the thermal pile sensing structure 40 of this embodiment, as shown in FIG. 6, the partition structure 25 includes both a MIM capacitor 25A and a PIP capacitor 26B. That is, the thermal pile sensing structure 40 of this embodiment include not only a MIM capacitor 25A but also a PIP capacitor 26B. the configuration of this embodiment can produce a relatively larger capacitor in a relatively smaller area.

As compared to the prior art, the thermal pile sensing structure 20, 30 and 40 of the foregoing embodiments remove external capacitors and therefore can effectively reduce the area of temperature sensing module. Besides, because the capacitors of the foregoing embodiments are integrated within the thermal pile sensing structure instead of being external components, the signal transmission noise can be reduced, which is also superior to the prior art.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the numbers of the metal layers and the via layers can be modified to any other numbers instead of the numbers in the shown embodiments. In view of the foregoing, the spirit of the present invention should cover all such and other modifications and variations, which should be interpreted to fall within the scope of the following claims and their equivalents.

What is claimed is:
1. A thermal pile sensing structure, comprising:
   a substrate, having a surface plane (X-Y plane) and a normal direction (Z-direction) which is perpendicular to the surface plane;
   an infrared sensing unit located above the substrate; and
   a partition structure, which extends in the Z-direction and around the infrared sensing unit;

wherein at least one cold junction is a part of a structure including the infrared sensing unit and the partition structure; and wherein at least one hot junction is a part of the infrared sensing unit;

wherein a temperature difference between the hot junction and the cold junction generates a voltage difference signal and a part of the partition structure has at least one capacitor having an upper electrode and a lower electrode, wherein the upper electrode is located at a higher level than the lower electrode in the Z-direction.

2. The thermal pile sensing structure of claim 1, wherein the at least one capacitor includes a Metal-Insulator-Metal (MIM) capacitor or a Polysilicon-Insulator-Polysilicon (PIP) capacitor.

3. The thermal pile sensing structure of claim 2, wherein the partition structure includes a stack of metal layers and via layers, and the MIM capacitor includes the upper electrode and the lower electrode which are formed by the metal layers.

4. The thermal pile sensing structure of claim 2, wherein the partition structure includes a stack of metal layers, via layers and polysilicon layers, and wherein the PIP capacitor includes the upper electrode and the lower electrode which are formed by the polysilicon layers.

5. The thermal pile sensing structure of claim 1, further comprising:
a dielectric layer located on or above the substrate, wherein the infrared sensing unit and the partition structure are formed within the dielectric layer.

6. The thermal pile sensing structure of claim 5, further comprising:
a bonding layer located on or above the dielectric layer; and
a light filter layer for filtering out signals other than infrared light signals, wherein the light filter layer is connected to the dielectric layer via the bonding layer.

7. The thermal pile sensing structure of claim 1, wherein the temperature difference between the hot junction and the cold junction is processed by a transistor circuit to generate the voltage difference signal, the transistor circuit being formed on the substrate.

* * * * *